United States Patent [19]

Miura et al.

[11] Patent Number: 4,735,876
[45] Date of Patent: Apr. 5, 1988

[54] ZINC-ALKALINE BATTERY

[75] Inventors: Akira Miura; Ryoji Okazaki, both of Katano; Kanji Takata, Neyagawa; Tsukasa Ohira, Katano, all of Japan

[73] Assignees: Matsushita Electric Industrial Co.; Ltd & Mitsui Mining & Smelting Co., Ltd., both of Tokyo, Japan

[21] Appl. No.: 935,166
[22] PCT Filed: Feb. 18, 1985
[86] PCT No.: PCT/JP85/00066
§ 371 Date: Aug. 12, 1985
§ 102(e) Date: Aug. 12, 1985
[87] PCT Pub. No.: WO85/03810
PCT Pub. Date: Aug. 29, 1985

Related U.S. Application Data

[63] Continuation of Ser. No. 767,777, Aug. 12, 1985, abandoned.

[30] Foreign Application Priority Data

Feb. 20, 1984 [JP] Japan ................................. 59-30550
Feb. 20, 1984 [JP] Japan ................................. 59-30561
Sep. 20, 1984 [JP] Japan ................................. 59-197197
Sep. 20, 1984 [JP] Japan ................................. 59-197198

[51] Int. Cl.$^4$ ............................................. H01M 4/40
[52] U.S. Cl. .................................... 429/206; 429/229; 429/230
[58] Field of Search ................. 429/229, 230, 231, 206

[56] References Cited

U.S. PATENT DOCUMENTS 4,376,810  3/1983  Takeda et al. .................. 429/230
4,500,614  2/1985  Nagamine et al. .............. 429/230

FOREIGN PATENT DOCUMENTS 1086309   8/1960  Fed. Rep. of Germany .
0003204   4/1958  Japan ............................ 429/230
042212   10/1977  Japan ............................ 429/229
0218760  12/1983  Japan ............................ 429/229
0022956  of 1893  United Kingdom ............. 429/230

Primary Examiner—Donald L. Walton
Attorney, Agent, or Firm—Stevens, Davis, Miller & Mosher

[57] ABSTRACT

This invention uses a zinc alloy containing In, one element of Al or Mg and, optionally, one or both of Pb and Cd for the anode of a zinc-alkaline battery which employs zinc as an active material of the anode (2), aqueous alkaline solution as an electrolyte, and manganese dioxide, silver oxide, oxygen and so forth as an active material of the cathode (5). The use of such zinc alloy permits the reduction of the amount to be used of mercury employed for amalgation of the anode zinc surface with the object of corrosion inhibition, thereby enabling the provision of a low pollution zinc-alkaline battery.

5 Claims, 1 Drawing Sheet

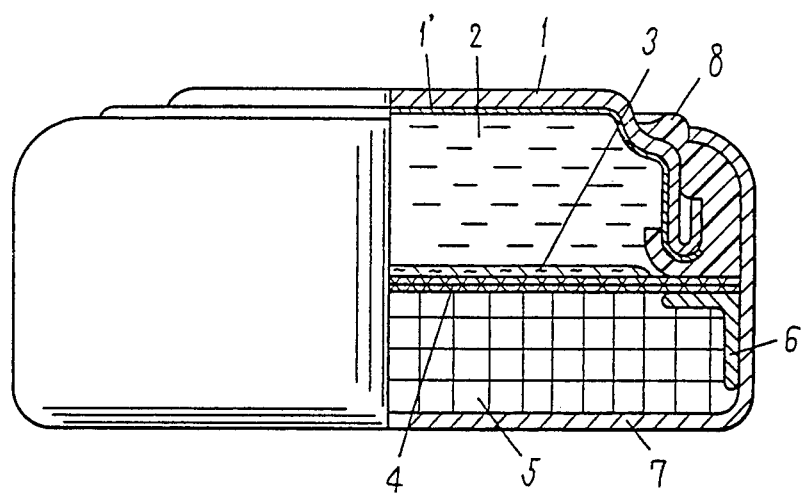

ZINC-ALKALINE BATTERY

This application is a continuation of application Ser. No. 767,777, filed Aug. 12, 1985, now abandoned.

TECHNICAL FIELD

This invention relates to an improvement for a zinc-alkaline battery using zinc as an anode active material, aqueous alkaline solution as an electrolyte, and manganese dioxide, silver oxide, mercury oxide, oxygen, or the like as a cathode active material. More particularly, it relates to a zinc-alkaline battery which has enable reduction of the amounts of mercury to be used for amalgamation of the anode zinc surface by using for the anode a zinc alloy containing indium (In), aluminum (Al), lead (Pb), and cadmium (Cd) in a specified combination.

BACKGROUND ART

A problem common to zinc-alkaline batteries is the corrosion of the anode zinc caused by the electrolyte. Namely, zinc is so reactive in an alkali electrolyte as reacting with the electrolyte during long term storage, thereby undergoing self-corrosion in accordance with the following equation:

$$Zn + 4OH^- \rightarrow Zn(OH)_4^{2-} + 2e^-$$

$$2H_2O + 2e^- \rightarrow 2OH^- + H_2 \uparrow$$

Hydrogen gas generated from the corrosion causes a gas pressure in the battery to elevate, which has the danger of causing leakage of electrolyte, bursting and the like. Accordingly, it has been hithertofore adopted as an industrial technique to use amalgamated zinc powder which is made by adding about 5 to 10% by weight of mercury to zinc, to increase the hydrogen overvoltage and to suppress corrosion to a practically allowable level. In recent years, however, there has been an increasing social demand to decrease the amount of mercury contained in a battery in order to lower environmental pollution, and various studies have been conducted. For example, methods have been proposed, which use zinc alloy powder formed by adding Pb, gallium, In etc. having a high hydrogen over-voltage into zinc to improve the corrosion resistance and to decrease the mercury concentration rate. Although these methods are effective in corrosion inhibition, they have an adverse effect in that their heavy load discharge performance is deteriorated due to the decrease of mercury concentration rate. Though the reasons why the deterioration of heavy road discharge performance occurs at the decreased mercury concentration rate in these proposed methods are not clear, they are presumably because the anode surface becomes covered with the discharge product of the zinc alloy anode, so that the smooth supply of hydroxide ions onto the zinc surface necessary for a discharge reaction is prevented. Thus, there is a need for a zinc anode of low mercury concentration rate which is excellent in both corrosion resistance and heavy load discharge performance.

Further, it has been proposed, mainly with the view of improving manganese dry batteries, that a good corrosion inhibitory effect can be obtained by using for an anode a zinc alloy formed by adding In to zinc or zinc alloy [Japanese Patent Application Kokoku (Post-Exam. Publn.) No. 3204/58]. Though the description of the above proposal includes the cases wherein besides In, one or more elements selected from Pb, Cd, Al, Mg, iron, chromium, calcium, mercury, bismuth, antimony, silver, silicon, nickel, manganese etc. are added to zinc as an impurity or as an additive, it does not state clearly whether the above-mentioned various elements are each contained as an impurity or added as an effective additive except for the effectiveness of In and Pb used in combination as an additive element. Further, it neither states which element is effective for corrosion inhibition, nor shows the suitable amount to be added except those for In and Pb. Thus, no investigation has ever been made on the effect of combined use of these elements, particularly for a zinc-alkali battery, to find an effective zinc alloy composition.

DISCLOSURE OF THE INVENTION

The object of this invention is to obtain a zinc-alkaline battery of low pollution and of excellent overall performance including discharge performance, storage property and prevention of alkaline leakage by using for the anode a zinc alloy containing In, Al, Mg, Pb and Cd in a specified combination, thereby decreasing the amalgamation rate without causing the deterioration of the discharge performance and the corrosion resistance of the anode.

More particularly, this invention is characterized by using a zinc alloy containing 0.01 to 0.5% by weight of In, 0.005 to 0.2% by weight of Al and optionally 0.01 to 0.5% by weight in total of one or both of Pb and Cd for the anode of the so-called zinc-alkaline battery, which uses zinc as an anode active material, an aqueous alkaline solution, containing mainly potassium hydroxide, sodium hydroxide or the like as the electrolyte, and manganese dioxide, silver oxide, mercury oxide, oxygen or the like as the cathode active material. Thus, an object of the present invention is to realize a zinc-alkaline battery of low pollution.

The effect of this invention, which has enabled the attainment of the above-mentioned object, may be understood as follows:

The problem is that there is no proceeding of discharge reactions at high currents due to the inhibition of a hydroxide ion supply caused by covering the anode surfaces with the discharge reaction products. This tendency remarkably appears when a low amalgamation rate of zinc alloy powder is used. The problem has been solved by means of alloying zinc by adding thereto a suitable amount of Al. In addition, In which is known to be greatly effective in improving the corrosion resistance of zinc is added, and optionally at the same time, a suitable amount of one or both of Pb and Cd is added to enhance further the corrosion inhibitory effect of In. Thus, a zinc anode having both excellent discharge performance and corrosion resistance has been developed, which is of a low mercury concentration rate, namely a mercury concentration rate of 3% by weight or less, preferably 1.5 to 0.2% by weight. Although the above-mentioned addition of Al is effective when the added amount is appropriate as will be shown later in the Examples, the working mechanism has not yet been fully elucidated. It may be supposed that since Al contained in the anode zinc as an alloy has a baser electric potential than zinc, it will discharge along with zinc, and either because of its discharge product promoting the dissolution of the discharged product from zinc or a zinc alloy containing In, Pb and the like into the electrolyte or because of the product playing a role of preventing the layer of the discharge product from the densification to passivate the zinc surface, an abundant supply of hydroxide ion onto the anode surface is continuously secured until zinc is fully consumed by discharge reaction, thereby elevating the utilization rate of zinc in discharge. Further, In is known to be the most effective one among all the elements to be added for corrosion inhibition of zinc; and it is supposed that, in addition to its inherent action of elevating the hydrogen overvoltage of zinc alloy, since In existing on the surface of zinc alloy and at the crystal grain boundary has a high affinity for mercury, In will allow the mercury, which is added to the zinc alloy for amalgamation, to be fixed onto the zinc alloy surface so as to suppress its diffusion into an inner part of the alloy or the grain boundary thereby maintaining the mercury concentration on the surface and the grain boundary at such a high level, as providing a high corrosion inhibitory effect even at a low mercury concentration rate. Further, when one or both of Pb and Cd having high hydrogen overvoltage are added together with In, the corrosion resistance is further improved owing to the combined effects with In. The above-mentioned effect of the addition of Al is effective not only in improving the discharge performance but also in enhancing the above-mentioned corrosion inhibitory effect of In, depending on amounts added of Al or Mg. It can be considered that when a zinc anode is corroded by electrolyte during a storage period of batteries, these metals are oxidized in preference to zinc because they are baser than zinc, so that there are formed oxide films which inactivate the active points present on the surface of zinc alloy to act to suppress the corrosion. However, the presence of excessive amounts of these elements is unfavorable because of the increased generation of hydrogen gas due to the excessive oxidation of the above mentioned metals baser than zinc.

Thus, this invention has enabled the provision of a zinc anode which is of a low mercury concentration rate i.e. 3% by weight or less, optionally 1.5 to 0.2% by weight, and is excellent in both discharge performance and corrosion resistance based on experimental investigation of combination and amounts to be added to the zinc alloy used for the anode.

BRIEF DESCRIPTION OF THE DRAWING

The Drawing is a side view showing the cross section of a part of a button-type silver oxide battery using the zinc alloy powder according to this invention as the anode active material.

BEST MODE FOR CARRYING OUT THE INVENTION

Hereunder will be described a process for producing a zinc alloy powder of this invention and an actual method of using the powder in a battery as the anode active material.

The zinc alloy powder of this invention can be obtained by a method which comprises injecting a molten metal with a compressed gas. More particularly, a zinc base metal of 99.997% purity is molten at about 500° C., and the respective given amounts of small pieces of elements to be added are added thereto and dissolved with stirring to produce a uniform molten alloy. The molten alloy is injected with compressed gas, such as compressed air, nitrogen gas or argon gas, of 4 Kg/cm$^2$ pressure in order to pulverize the alloy. After being sieved to a particle size range of 50 to 150 mesh, the powders are thrown into a 10% by weight aqueous potassium hydroxide solution, and then amalgamated by dropwise addition of a given amount of metallic mercury with stirring, and washed with water. After replacing the water with acetone followed by vacuum drying, an amalgamated zinc alloy powder is obtained. The amalgamated zinc alloy powder thus prepared is then added with stirring to a gel-like electrolyte, which has been obtained by gelating an alkali electrolyte with a water-soluble high molecular substance such as carboxymethyl cellulose, sodium polyacrylate and the like to give a uniformly dispersed gel-like anode, and a predetermined amount thereof is then filled into the anode part by means of a pump or the like to compose a battery.

EXAMPLE

The above-mentioned procedures for preparing the zinc alloy powder were followed to prepare various kinds of zinc alloy powder (these being referred to as Examples 1 to 24), wherein the combinations of the added elements were In-Al, In-Al-Pb, In-Al-Cd, or In-Al-Pb-Cd and the proportions of the added elements relative to zinc are in the range of 0.01 to 0.5% by weight for In, 0.005 to 0.2% for Al and 0.01 to 0.5% by weight in total for Pb and Cd. Further, alloy powders were prepared in which the added element was either one of In or Al; zinc alloy powders in which alloy compositions were same as mentioned above but the proportion of the added elements were outside the range of the working examples; and a powder containing no added element. These were referred to as Comparative Examples 25 to 38.

These zinc alloy powders which were further amalgamated to a mercury concentration rate of 1.0% by weight were used to compose a button-type silver oxide battery shown in the Drawing. In the Drawing, 1 is a seal plate made of stainless steel, whose inner face has been coated with copper plating 1'; 2 is a zinc anode manufactured by dispersing the amalgamated zinc powder according to this invention into a gel which has been prepared by gelating with carboxymethyl cellulose an electrolyte prepared by saturating aqueous 40% by weight solution of potassium hydroxide with zinc oxide; 3 is a cellulosic electrolyte absorbent; 4 is a separator made of porous polypropylene; 5 is a cathode made by press-molding a mixture of silver oxide and graphite; 6 is a cathode ring made of iron plated with nickel; 7 is a cathode can made of iron, whose surface is plated with nickel; 8 is a gasket made of nylon which is compressed between the cathode can and the seal plate by bending the cathode can. The battery made on experimental basis had a diameter of 11.6 mm and a height of 5.4 mm. The weights of the amalgamated zinc alloy powders were all fixed at one value of 193 mg each. In the following Table are shown the compositions of the zinc alloy powder of the manufactured battery and the average values of the discharge performance and the change in the total height of the battery after 1 month of storage at a temperature of 60° C. The discharge performance was expressed in terms of the duration of discharge when the discharge was conducted at 20° C. and at 510 Ω down to an end voltage of 0.9 V.

| Battery No. | Added elements and their content in zinc alloy (% by weight) | | | Duration of discharge (hrs) (n = 3) | Change in total height of battery (μm) (n = 20) |
|---|---|---|---|---|---|
| 1 | In (0.01) | Al (0.005) | | 40 | 0 |
| 2 | In (0.01) | Al (0.01) | | 43 | −2 |
| 3 | In (0.01) | Al (0.05) | | 46 | −3 |
| 4 | In (0.01) | Al (0.1) | | 46 | −3 |
| 5 | In (0.05) | Al (0.01) | | 45 | −4 |
| 6 | In (0.05) | Al (0.05) | | 45 | −13 |
| 7 | In (0.05) | Al (0.1) | | 44 | −6 |
| 8 | In (0.1) | Al (0.01) | | 44 | −3 |
| 9 | In (0.1) | Al (0.05) | | 45 | −6 |
| 10 | In (0.1) | Al (0.1) | | 46 | −4 |
| 11 | In (0.2) | Al (0.01) | | 45 | −7 |
| 12 | In (0.3) | Al (0.1) | | 41 | −1 |
| 13 | In (0.5) | Al (0.2) | | 40 | 0 |
| 14 | In (0.01) | Al (0.005) | Pb (0.01) | 45 | −3 |
| 15 | In (0.01) | Al (0.01) | Pb (0.05) | 47 | −5 |
| 16 | In (0.2) | Al (0.05) | Pb (0.01) | 47 | −6 |
| 17 | In (0.05) | Al (0.05) | Pb (0.05) | 51 | −11 |
| 18 | In (0.05) | Al (0.1) | Pb (0.5) | 46 | −7 |
| 19 | In (0.1) | Al (0.05) | Pb (0.05) | 52 | −8 |
| 20 | In (0.5) | Al (0.2) | Pb (0.5) | 45 | −3 |
| 21 | In (0.05) | Al (0.05) | Cd (0.05) | 48 | −5 |
| 22 | In (0.1) | Al (0.05) | Cd (0.05) | 47 | −6 |
| 23 | In (0.05) | Al (0.05) Pb (0.05) | Cd (0.05) | 47 | −5 |
| 24 | In (0.05) | Al (0.05) Pb (0.1) | Cd (0.1) | 46 | −6 |
| 25 | In (0.005) | | | 24 | +56 |
| 26 | In (0.01) | | | 36 | +2 |
| 27 | In (0.05) | | | 38 | +1 |
| 28 | In (0.5) | | | 39 | 0 |
| 29 | In (1.0) | | | 37 | +1 |
| 30 | Al (0.05) | | | 16 | +120 |
| 31 | In (0.005) | Al (0.05) | | 32 | +15 |
| 32 | In (0.05) | Al (0.001) | | 34 | +10 |
| 33 | In (0.05) | Al (0.5) | | 30 | +14 |
| 34 | In (0.005) | Al (0.05) | Pb (0.05) | 37 | +28 |
| 35 | In (0.05) | Al (0.05) | Pb (0.005) | 42 | +1 |
| 36 | In (0.05) | Al (0.05) | Pb (1.0) | 40 | +4 |
| 37 | In (1.0) | Al (0.05) | Pb (0.05) | 40 | +1 |
| 38 | None | | | — | — |

In the above Table, where no additional element is added (Comparative Example 38), no change in the Comparative Examples (31) to (37) show those cases wherein, though the alloy compositions are the same as those in the working examples, the contents of added elements are insufficient or excessive. The results reveal that either the discharge property or the corrosion resistance or both of them are poor as compared with those in the working examples.

As described above, a zinc-alkaline battery has been developed having low pollution and excellent practical performance by finding the contents of elements to be added which can obviate the defects of alloys (25) to (29) and (30) and can give effectively their synergistic effect.

Although this invention was illustrated with reference to a silver oxide battery in the Examples, the zinc alloy powder according to this invention can also be applied to other zinc-alkaline batteries using zinc as the anode. Particularly in the case of open-type air batteries or closed-type alkali-manganese batteries provided with a hydrogen-absorption system, in which the allowable amount of evolving hydrogen gas is relatively large, the zinc alloy can be used at a low mercury concentration rate and, under a certain circumstances, even without amalgamation.

INDUSTRIAL APPLICABILITY

As described above, according to this invention, the mercury concentration rate of anode zinc can be decreased and a low pollution zinc-alkaline battery can be manufactured very easily.

We claim:

1. A zinc-alkaline battery in which there is used as an anode active material a zinc alloy powder containing zinc as the principal component, 0.01 to 0.5% by weight of In, 0.005 to 0.2% by weight of Al, and further 0.01 to 0.5% by weight in total of either one or both of Pb and Cd.

2. The zinc-alkaline battery according to claim 1 wherein the anode active material contains 0.01 to 0.2% by weight of In, 0.01 to 0.1% by weight of Al and, further 0.01 to 0.5% by weight in total of either one or both of Pb and Cd.

3. The zinc-alkaline battery according to claim 1 wherein the anode active material contains 0.05 to 0.1% by weight of In, 0.05% by weight of Al, and 0.05% by weight of Pb.

4. A zinc-alkaline battery in which there is used as an anode active material a zinc alloy powder containing 0.01 to 0.5% by weight of In, 0.005 to 0.2% by weight of Al and, further 0.01 to 0.5% by weight in total of either one or both of Pb and Cd, said alloy being amalgamated to a mercury concentration of 3% by weight or less.

5. The zinc-alkaline battery according to claim 4, wherein the anode active material contains 1.5 to 0.2% by weight of mercury.

* * * * *